(12) United States Patent
Chiou et al.

(10) Patent No.: US 10,702,363 B2
(45) Date of Patent: Jul. 7, 2020

(54) FULLY EDENTULOUS JAW 3D FACIAL UNIVERSAL TEMPORAL RELATIONSHIP RECORDING DEVICE

(71) Applicants: Wen-Hsin Chiou, Taichung (TW); Jhen-Guo Tsai, Tainan (TW)

(72) Inventors: Wen-Hsin Chiou, Taichung (TW); Jhen-Guo Tsai, Tainan (TW)

(*) Notice: Subject to any disclaimer, the term of this patent is extended or adjusted under 35 U.S.C. 154(b) by 301 days.

(21) Appl. No.: 15/939,170

(22) Filed: Mar. 28, 2018

(65) Prior Publication Data

US 2019/0298501 A1    Oct. 3, 2019

(51) Int. Cl.
*A61C 19/045*    (2006.01)
*A61C 19/05*    (2006.01)

(52) U.S. Cl.
CPC ............ *A61C 19/045* (2013.01); *A61C 19/05* (2013.01)

(58) Field of Classification Search
CPC ....... A61C 19/045; A61C 19/04; A61C 19/05; A61C 19/055
See application file for complete search history.

(56) References Cited

U.S. PATENT DOCUMENTS

| | | | | |
|---|---|---|---|---|
| 3,855,703 A * | 12/1974 | Jarvis | ..................... | A61C 19/05 433/45 |
| 4,286,947 A * | 9/1981 | Daiberl | .................. | A61C 19/04 433/72 |
| 5,186,624 A * | 2/1993 | Gottsleben | ............. | A61C 19/05 433/69 |
| 5,188,529 A * | 2/1993 | Luth | ...................... | A61C 19/05 433/68 |
| 8,070,489 B2 * | 12/2011 | Massad | .................. | A61C 19/05 433/71 |
| 8,277,216 B2 * | 10/2012 | Kim | ..................... | A61C 9/0006 433/37 |
| 8,876,527 B2 * | 11/2014 | Lang | ..................... | A61C 19/05 433/69 |
| 8,899,983 B2 * | 12/2014 | Kim | ..................... | A61C 9/0006 433/214 |
| 10,231,806 B2 * | 3/2019 | Chou | ..................... | A61C 13/01 |
| 2006/0172254 A1 * | 8/2006 | Shindo | ..................... | A61C 7/36 433/68 |
| 2007/0231774 A1 * | 10/2007 | Massad | .................. | A61C 19/05 433/213 |
| 2016/0008106 A1 * | 1/2016 | Chiou | .................. | A61C 9/0006 433/37 |
| 2019/0298501 A1 * | 10/2019 | Chiou | ................... | A61C 9/004 |

* cited by examiner

*Primary Examiner* — Ralph A Lewis
(74) *Attorney, Agent, or Firm* — Pro-TECHTOR International Services; Ian Oglesby

(57) ABSTRACT

A fully edentulous jaw 3D facial universal temporal relationship recording device includes a swing plate, a first substrate, a second substrate, an upper jaw plate, a lower jaw plate, two universal components and a horizontal detector. Each universal component is composed of a ball socket member having a ball socket portion and a ball head member having a spherical portion, and each ball socket member is fixed to the top side of the first and second substrates, and each ball head member is fixed to a bottom side of the swing plate and the upper jaw plate, so that the spherical portion of each ball head member is received and positioned at the ball socket portion of each ball socket member, and the horizontal detector is installed at the assembling portion of the swing plate for making horizontal adjustments and correction accurately.

8 Claims, 5 Drawing Sheets

US 10,702,363 B2

1

FULLY EDENTULOUS JAW 3D FACIAL UNIVERSAL TEMPORAL RELATIONSHIP RECORDING DEVICE

FIELD OF THE INVENTION

The present disclosure relates to a fully edentulous jaw 3D facial universal temporal relationship recording device, in particular to the fully edentulous jaw 3D facial universal temporal relationship recording device capable of repairing a denture quickly and saving time.

BACKGROUND OF THE INVENTION

In general, people have to pull out their teeth and install artificial teeth or dentures when losing all their teeth or due to other factors such as medical treatment, accidental atrophy, old age, etc. Among full dentures, the most common one is in form of a removable denture comprising a whole set of upper jaw teeth and lower jaw teeth. The size and shape of the full denture are adjusted before it is installed onto the soft tissues of a patient's upper and lower jaws for the purpose of an oral dental reconstruction.

As the material science advances, the dentures become more sturdy, durable and natural looking, and the development of the denture design further improves the patients' comfort and chewing efficiency.

Before a dynamic biting relationship path is recorded, it is necessary to create a patient's biting plane in order to obtain a reference path. In a prior art, upper and lower jaws models and the biting vertical height at a still condition are obtained, but horizontal adjustments and corrections cannot be made accurately inside a patient's mouth, so that it is unable to analyze the distribution of bite points, the relative relation of the upper and lower jaws, and the positioning of the biting plane of the denture. Obviously, the prior art requires improvements.

SUMMARY OF THE INVENTION

Therefore, it is a primary objective of the present invention to overcome the aforementioned drawbacks by providing a fully edentulous jaw 3D facial universal temporal relationship recording device capable of preforming horizontal adjustments and corrections accurately and conveniently and analyzing the distribution of bite points, the relative relation of the upper and lower jaws, and the positioning of the biting plane of the denture quickly to produce a full-mouth reconstruction denture in compliance with physiological functions.

To achieve the aforementioned and other objectives, the present disclosure provides a fully edentulous jaw 3D facial universal temporal relationship recording device, comprising: a swing plate, having an assembling portion disposed at an end of the swing plate; a first substrate, disposed on a bottom side of the swing plate; a second substrate, disposed on a top side of the swing plate; an upper jaw plate, disposed on a top side of the second substrate; a lower jaw plate, disposed on a bottom side of the first substrate; two universal components, each comprising a ball socket member having a ball socket portion and a ball head member having a spherical portion, and each ball socket member being fixed to a predetermined position of the top sides of the first and second substrates, and each ball head member being fixed to a predetermined position of the bottom sides of the swing plate and the upper jaw plate, so that the spherical portion of each ball head member is received and positioned at the ball

2 socket portion of each ball socket member; and a facial scan positioning block, installed at the assembling portion of the swing plate.

The fully edentulous jaw 3D facial universal temporal relationship recording device further comprises a positioning plate, a flange protruded from a relative side of the internal periphery of the positioning plate, a pillar disposed at the top and bottom sides of each flange, an extending plate disposed at a position of the swing plate opposite to each flange, a through hole formed at a position of each extending plate opposite to each pillar and provided for the pillar disposed on the bottom side of the positioning plate, a fork plate disposed at a position of the second substrate opposite to each flange, and a penetrating hole formed at a position of each fork plate opposite to each pillar and provided for receiving and positioning the pillar disposed on the top side of the positioning plate.

Wherein, the assembling portion of the swing plate is a notch, and the facial scan positioning block has a guide rail disposed on the top side of the facial scan positioning block and provided for the notch to be slidably positioned.

Wherein, the upper jaw plate is substantially a concave arc plate.

Wherein, the lower jaw plate is substantially a U-shaped plate.

In addition, this disclosure further provides a fully edentulous jaw 3D facial universal temporal relationship recording device, comprising: a swing plate, having an assembling portion disposed at an end of the swing plate; a first substrate, disposed on a bottom side of the first substrate; a second substrate, disposed on a top side of the swing plate; an upper jaw plate, disposed on a top side of the second substrate; a lower jaw plate, disposed on a bottom side of the first substrate; two universal components, each comprising a ball socket member having a ball socket portion and a ball head member having a spherical portion, and each ball socket member being fixed to a predetermined position of the top side of the first and second substrates, and each ball head member being fixed to a predetermined position of the bottom side of the swing plate and the upper jaw plate, so that the spherical portion of each ball head member is received and positioned at the ball socket portion of each ball socket member; and a horizontal detector, installed at the assembling portion of the swing plate.

Wherein, the horizontal detector has a window formed on the top side of the horizontal detector, and the window has a liquid bead disposed therein for showing a horizontal level.

Wherein, the assembling portion of the swing plate is a notch, and a guide rail is disposed on a bottom side of the horizontal detector and provided for the notch to be slidably positioned.

DESCRIPTION OF THE PREFERRED EMBODIMENTS

Figure 1:
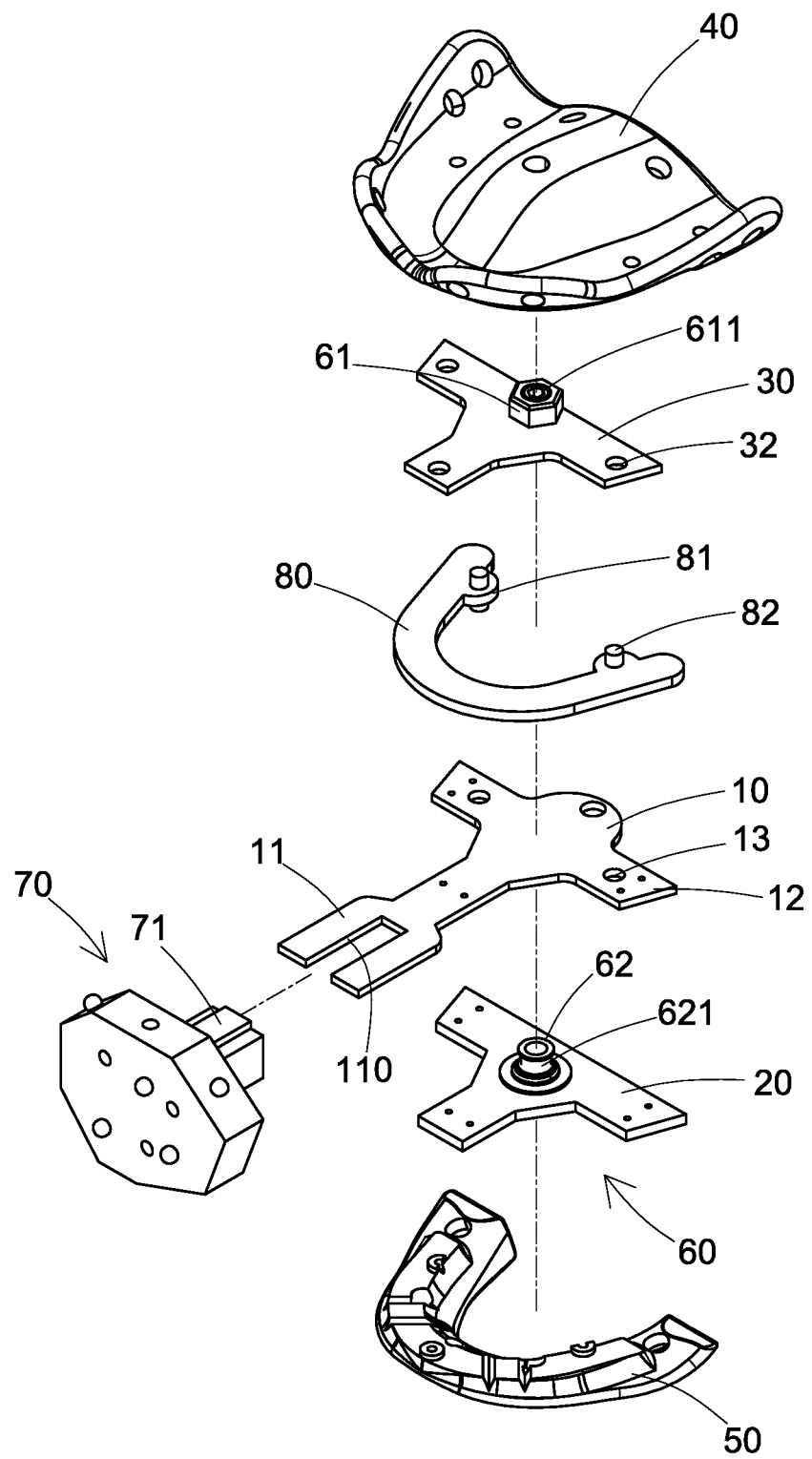
FIG. 1 is an exploded view of this disclosure.

With reference to FIGS. 1 to 4 for a fully edentulous jaw 3D facial universal temporal relationship recording device of this disclosure, the fully edentulous jaw 3D facial universal temporal relationship recording device comprises:

a swing plate 10, having an assembling portion 11 disposed at an end of the swing plate 10;

a first substrate 20, disposed on a bottom side of the swing plate 10;

a second substrate 30, disposed on a top side of the swing plate 10;

an upper jaw plate 40, being substantially a concave plate, disposed on a top side of the second substrate 30;

a lower jaw plate 50, being substantially a U-shaped plate, disposed on a bottom side of the first substrate 20;

two universal components 60, each comprising a ball socket member 61 having a ball socket portion 611 and a ball head member 62 having a spherical portion 621, and each ball socket member 61 being fixed to a predetermined position of the top side of the first and second substrates 20, 30, and each ball head member 62 being fixed to a predetermined position of the bottom side of the swing plate 10 and the upper jaw plate 40, so that the spherical portion 621 of each ball head member 62 is received and positioned at the ball socket portion 611 of each ball socket member 61; and a facial scan positioning block 70, disposed at the assembling portion 11 of the swing plate 10.

The fully edentulous jaw 3D facial universal temporal relationship recording device further comprises a positioning plate 80 which is substantially U-shaped, a flange 81 protruded from a relative side of the internal periphery of the positioning plate 80, a pillar 82 disposed at the top and bottom sides of each flange 81, an extending plate 12 disposed at a position of the swing plate 10 opposite to each flange 81, a through hole 13 formed at a position of each extending plate 12 opposite to each pillar 82, and provided for receiving and positioning the pillar 82 disposed on the bottom side of the positioning plate 80, a fork plate 31 disposed at a position of the second substrate opposite to each flange 81, a penetrating hole 32 formed at a position of each fork plate 31 opposite to each pillar 82 and provided for receiving and positioning the pillar 82 disposed on the top side of the positioning plate 80.

Figure 2:
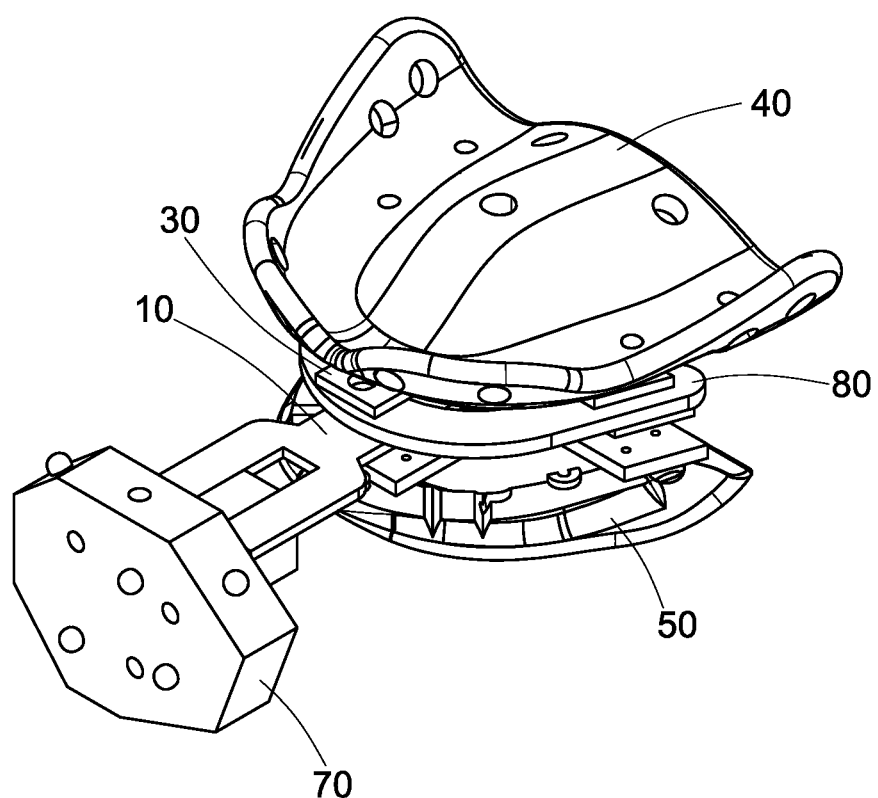
FIG. 2 is a perspective view of this disclosure.
Figure 3:
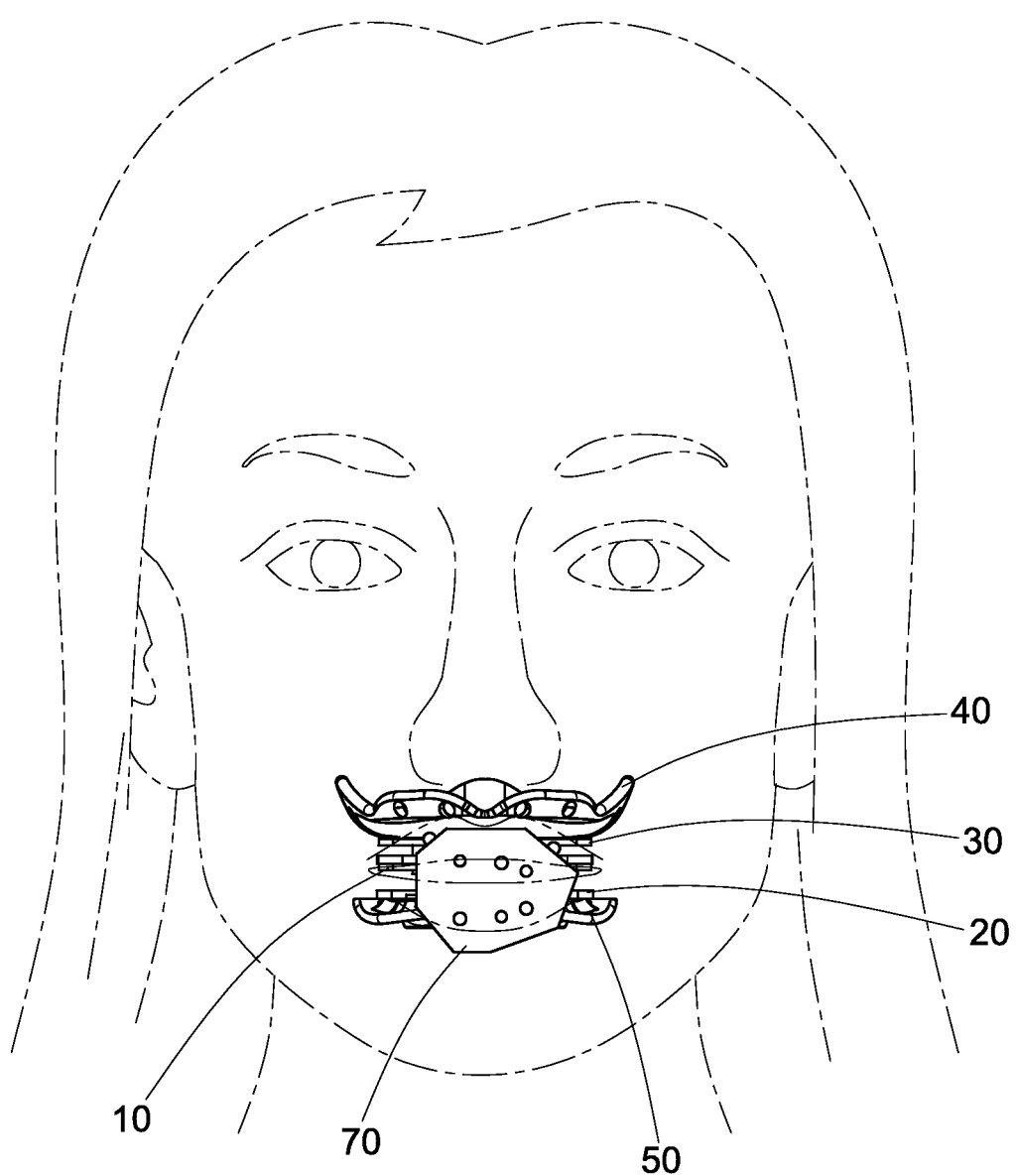
FIG. 3 is a front view of a patient's assembly in accordance with an embodiment of this disclosure.
Figure 4:
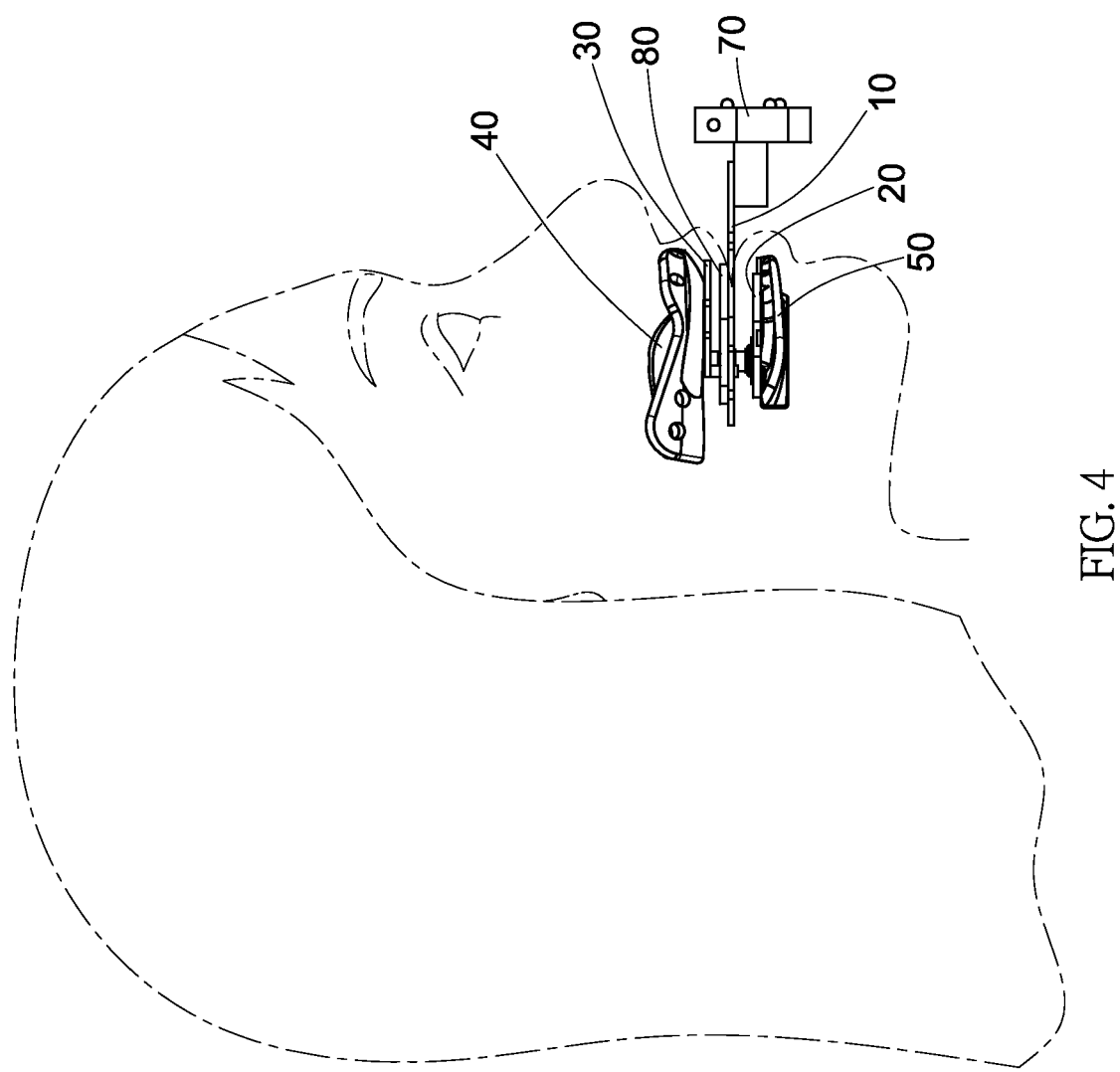
FIG. 4 is a side view of a patient's assembly in accordance with an embodiment of this disclosure.

Wherein, the assembling portion 11 of the swing plate 10 is a notch 110, and the facial scan positioning block 70 has a guide rail 71 disposed on a top side of the facial scan positioning block 70 and provided for the notch 110 to be slidably positioned (as shown in FIGS. 1 and 2).

With reference to FIGS. 1 to 5 for a fully edentulous jaw 3D facial universal temporal relationship recording device of this disclosure, the fully edentulous jaw 3D facial universal temporal relationship recording device comprises:

a swing plate 10, having an assembling portion 11 disposed at an end of the swing plate 10;

a first substrate 20, disposed on a bottom side of the swing plate 10;

a second substrate 30, disposed on a top side of the swing plate 10;

an upper jaw plate 40, being substantially a concave arc plate, disposed on a top side of the second substrate 30;

a lower jaw plate 50, being substantially a U-shaped plate, disposed on a bottom side of the first substrate 20;

two universal components 60, each comprising a ball socket member 61 having a ball socket portion 611 and a ball head member 62 having a spherical portion 621, and each ball socket member 61 being fixed to a predetermined position of the top side of the first and second substrates 20, 30, and each ball head member 62 being fixed to a predetermined position of the bottom side of the swing plate 10 and the upper jaw plate 40, so that the spherical portion 621 of each ball head member 62 is received and positioned at the ball socket portion 611 of each ball socket member 61; and a horizontal detector 90, disposed at the assembling portion 11 of the swing plate 10.

Figure 5:
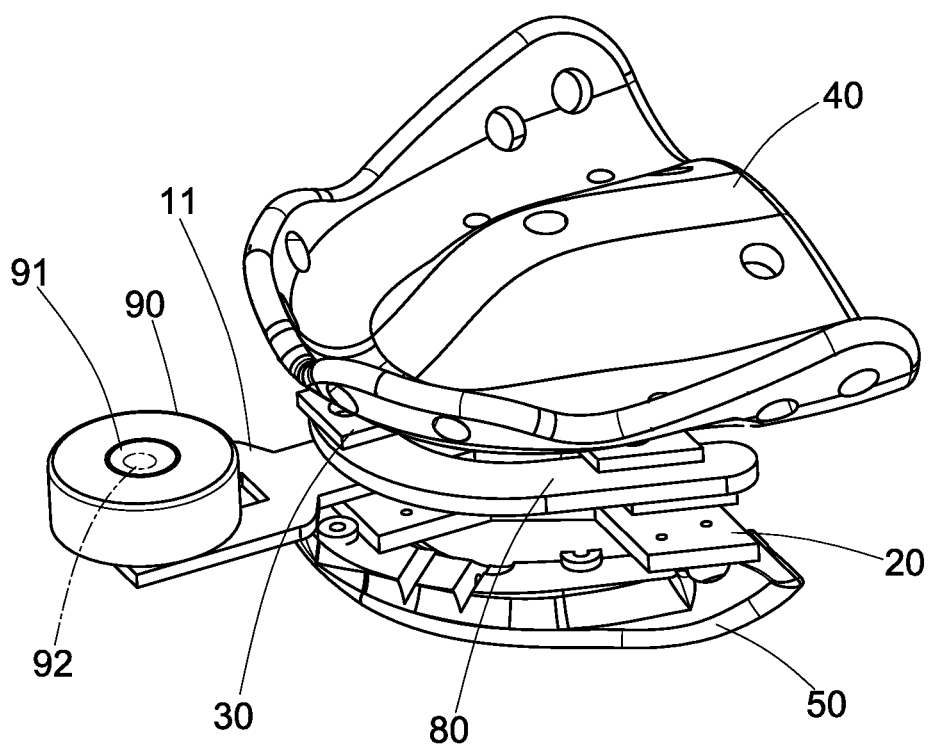
FIG. 5 is another perspective view of this disclosure.

Wherein, the horizontal detector 90 has a window 91 formed on a top side of the horizontal detector 90 and the window 91 has a liquid bead 9 installed therein for indicating a horizontal level (as shown in FIG. 5).

Wherein, the assembling portion 11 of the swing plate 10 is a notch 110, and the horizontal detector 90 has a guide rail (not shown in the figure) disposed on a bottom side of the horizontal detector 90, and the guide rail is provided for the notch 110 to be slidably positioned (as shown in FIG. 5). In FIGS. 1 to 5, the device of this disclosure is formed by the aforementioned components. When a patient wants to this device, the patient should sit upright at 90 degrees, and then fix the lower jaw plate 50 to the patient's lower jaw gum, and install the spherical portion 621 of the ball head member 62 of one of the universal components 60 fixed to the swing plate 10 to the ball socket portion 611 of the ball socket member 61 of the first substrate 20, and install the horizontal detector 90 and adjust the horizontal biting position between the jaws, and finally complete the positioning in the patient's mouth. Photocurable resin or silicon for occlusion is used for the fixation, and then the positioning plate 80, second substrate 30 and upper jaw plate 40 are installed separately, and the upper jaw plate 40 is fixed to the patient's upper jaw gum, and the photocurable resin is used to fix the upper jaw plate 40. Before the positioning plate 80 is removed, the biting vertical height is measured. If it is necessary to adjust the biting vertical height, adjustments may be made after the positioning plate 80 is removed. Color paint is coated to perform mandibular protrusion movement and sideway movement, and the movement paths are recorded repeatedly, and the center relationship position is set by the intersection of three movement paths, or the upper and lower jaw may contact with each other generally to confirm the position. Silicon used for occlusion is applied for the fixing the occlusion relationship of the upper and lower jaws, and finally the distribution of bite points, the relative relation of the upper and lower jaws are analyzed, so as to produce a full-mouth reconstruction denture in compliance with physiological functions. The process taken is accurate and quick, and thus reducing the number of patient visits significantly.

What is claimed is:

1. A fully edentulous jaw 3D facial universal temporal relationship recording device, comprising:
    a swing plate, having an assembling portion disposed at an end of the swing plate;
    a first substrate, disposed on a bottom side of the swing plate;
    a second substrate, disposed on a top side of the swing plate;
    an upper jaw plate, disposed on a top side of the second substrate;
    a lower jaw plate, disposed on a bottom side of the first substrate;
    two universal components, each comprising a ball socket member having a ball socket portion and a ball head member having a spherical portion, and each ball socket member being fixed to a predetermined position of the top sides of the first and second substrates, and each ball head member being fixed to a predetermined position of the bottom sides of the swing plate and the upper jaw plate, so that the spherical portion of each ball head member is received and positioned at the ball socket portion of each ball socket member; and a facial scan positioning block, installed at the assembling portion of the swing plate.

2. The fully edentulous jaw 3D facial universal temporal relationship recording device of claim 1, further comprising a positioning plate, a flange protruded from a relative side of the internal periphery of the positioning plate, a pillar disposed at the top and bottom sides of each flange, an extending plate disposed at a position of the swing plate opposite to each flange, a through hole formed at a position of each extending plate opposite to each pillar and provided for receiving and positioning the pillar disposed on the bottom side of the positioning plate, a fork plate disposed at a position of the second substrate opposite to each flange, and a penetrating hole formed at a position of each fork plate opposite to each pillar and provided for receiving and positioning the pillar disposed on the top side of the positioning plate.

3. The fully edentulous jaw 3D facial universal temporal relationship recording device of claim 1, wherein the assembling portion of the swing plate is a notch, and the facial scan positioning block has a guide rail disposed on the top side of the facial scan positioning block and provided for the notch to be slidably positioned.

4. The fully edentulous jaw 3D facial universal temporal relationship recording device of claim 1, wherein the upper jaw plate is substantially a concave arc plate.

5. The fully edentulous jaw 3D facial universal temporal relationship recording device of claim 1, wherein the lower jaw plate is substantially a U-shaped plate.

6. A fully edentulous jaw 3D facial universal temporal relationship recording device, comprising:

a swing plate, having an assembling portion disposed at an end of the swing plate;

a first substrate, disposed on a bottom side of the first substrate;

a second substrate, disposed on a top side of the swing plate;

an upper jaw plate, disposed on a top side of the second substrate;

a lower jaw plate, disposed on a bottom side of the first substrate;

two universal components, each comprising a ball socket member having a ball socket portion and a ball head member having a spherical portion, and each ball socket member being fixed to a predetermined position of the top side of the first and second substrates, and each ball head member being fixed to a predetermined position of the bottom side of the swing plate and the upper jaw plate, so that the spherical portion of each ball head member is received and positioned at the ball socket portion of each ball socket member; and a horizontal detector, installed at the assembling portion of the swing plate.

7. The fully edentulous jaw 3D facial universal temporal relationship recording device of claim 6, wherein the horizontal detector has a window formed on the top side of the horizontal detector, and the window has a liquid bead installed therein for indicating a horizontal level.

8. The fully edentulous jaw 3D facial universal temporal relationship recording device of claim 7, wherein the assembling portion of the swing plate is a notch, and a guide rail is disposed on a bottom side of the horizontal detector and provided for the notch to be slidably positioned.

* * * * *